United States Patent
Dasgupta et al.

(10) Patent No.: US 9,813,432 B2
(45) Date of Patent: Nov. 7, 2017

(54) TRACKING ANOMALY PROPAGATION AT THE NETWORK LEVEL

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 14/604,175

(22) Filed: Jan. 23, 2015

(65) Prior Publication Data

US 2016/0218949 A1    Jul. 28, 2016

(51) Int. Cl.
G06F 15/16 (2006.01)
H04L 29/06 (2006.01)
G06F 11/34 (2006.01)

(52) U.S. Cl.
CPC ...... *H04L 63/1416* (2013.01); *G06F 11/3409* (2013.01); *G06F 11/3466* (2013.01); *G06F 2201/86* (2013.01)

(58) Field of Classification Search
CPC ........... G06F 11/3409; G06F 2201/865; G06F 11/3466; G06F 2201/86
USPC .................................................. 709/223, 224
See application file for complete search history.

(56) References Cited

U.S. PATENT DOCUMENTS

| | | | | |
|---|---|---|---|---|
| 8,307,074 B1* | 11/2012 | Martin | ................ | H04L 12/6418 709/206 |
| 8,812,586 B1* | 8/2014 | Kulkarni | ............... | H04L 41/065 709/203 |
| 8,966,039 B1* | 2/2015 | Fultz | ...................... | H04L 67/16 709/223 |
| 9,071,576 B1* | 6/2015 | Earl | .................... | H04L 63/0236 |
| 2004/0153823 A1* | 8/2004 | Ansari | ................ | G06F 11/0715 714/38.14 |
| 2005/0120090 A1* | 6/2005 | Kamiya | ................ | H04L 12/585 709/213 |
| 2006/0085546 A1* | 4/2006 | Abdo | ................... | G06F 21/105 709/227 |
| 2007/0086336 A1* | 4/2007 | Richards | ................ | C07F 17/00 370/229 |
| 2012/0053925 A1* | 3/2012 | Geffin | .................. | G06F 1/3206 703/21 |
| 2012/0294511 A1* | 11/2012 | Datta | ................. | G06K 9/00771 382/155 |
| 2013/0007265 A1* | 1/2013 | Benedetti | ............ | H04L 67/1097 709/224 |

(Continued)

OTHER PUBLICATIONS

Sajassi et al., "BGP MPLS Based Ethernet VPN", Network Working Group Internet-Draft, <draft-ietf-l2vpn-evpn-11>, Oct. 18, 2014, 52 pages, Internet Engineering Task Force Trust.

*Primary Examiner* — Hieu Hoang
(74) *Attorney, Agent, or Firm* — Parker Ibrahim & Berg LLC; James M. Behmke; Stephen D. LeBarron

(57) ABSTRACT

In one embodiment, a device in a network monitors one or more metrics regarding network traffic associated with a particular application. The device detects an application-centric anomaly based on the monitored one or more metrics. The device causes an anomaly mitigation action to be performed in the network, in response to detecting the application-centric anomaly.

24 Claims, 17 Drawing Sheets

(56) References Cited

U.S. PATENT DOCUMENTS

| | | | |
|---|---|---|---|
| 2013/0054784 A1* | 2/2013 | Yadav | H04L 43/0876 709/224 |
| 2013/0298242 A1* | 11/2013 | Kumar | G06F 21/52 726/25 |
| 2014/0006612 A1* | 1/2014 | Fallon | H04L 12/2602 709/224 |
| 2014/0108640 A1* | 4/2014 | Mathis | H04L 41/145 709/224 |
| 2014/0113588 A1* | 4/2014 | Chekina | G06F 21/552 455/410 |
| 2014/0289418 A1* | 9/2014 | Cohen | G06F 11/3688 709/226 |
| 2014/0372347 A1* | 12/2014 | Cohen | G06F 11/0709 706/12 |
| 2015/0326446 A1* | 11/2015 | Koverman | H04L 41/50 709/224 |
| 2016/0149792 A1* | 5/2016 | Wang | H04L 69/03 709/224 |

* cited by examiner

TRACKING ANOMALY PROPAGATION AT THE NETWORK LEVEL

TECHNICAL FIELD

The present disclosure relates generally to computer networks, and, more particularly, to tracking anomaly propagation in a computer network at the network level.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
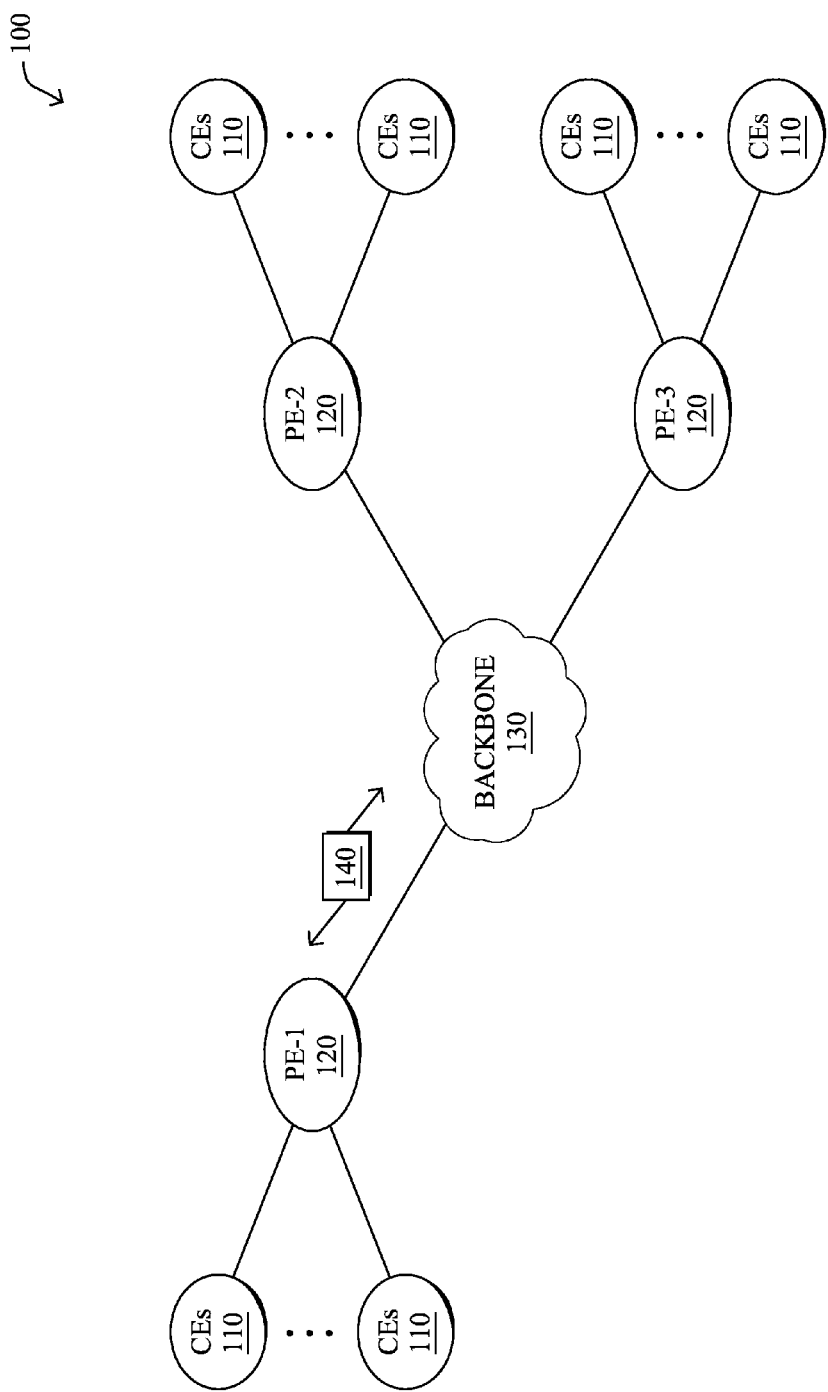
FIGS. 1A-1B illustrate an example communication network.

According to one or more embodiments of the disclosure, a device in a network monitors one or more metrics regarding network traffic associated with a particular application. The device detects an application-centric anomaly based on the monitored one or more metrics. The device causes an anomaly mitigation action to be performed in the network, in response to detecting the application-centric anomaly.

In further embodiments, a first device in a network registers a particular application with a second device in the network. The first device specifies one or more application-centric metrics to be monitored by the second device that are associated with the particular application. The first device specifies one or more anomaly conditions for the application-centric metrics. The second device uses the specified one or more anomaly conditions and the specified one or more application-centric metrics to detect an anomaly in network traffic associated with the particular application. The first device receives an indication of the detected anomaly from the second device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement (SLA) characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
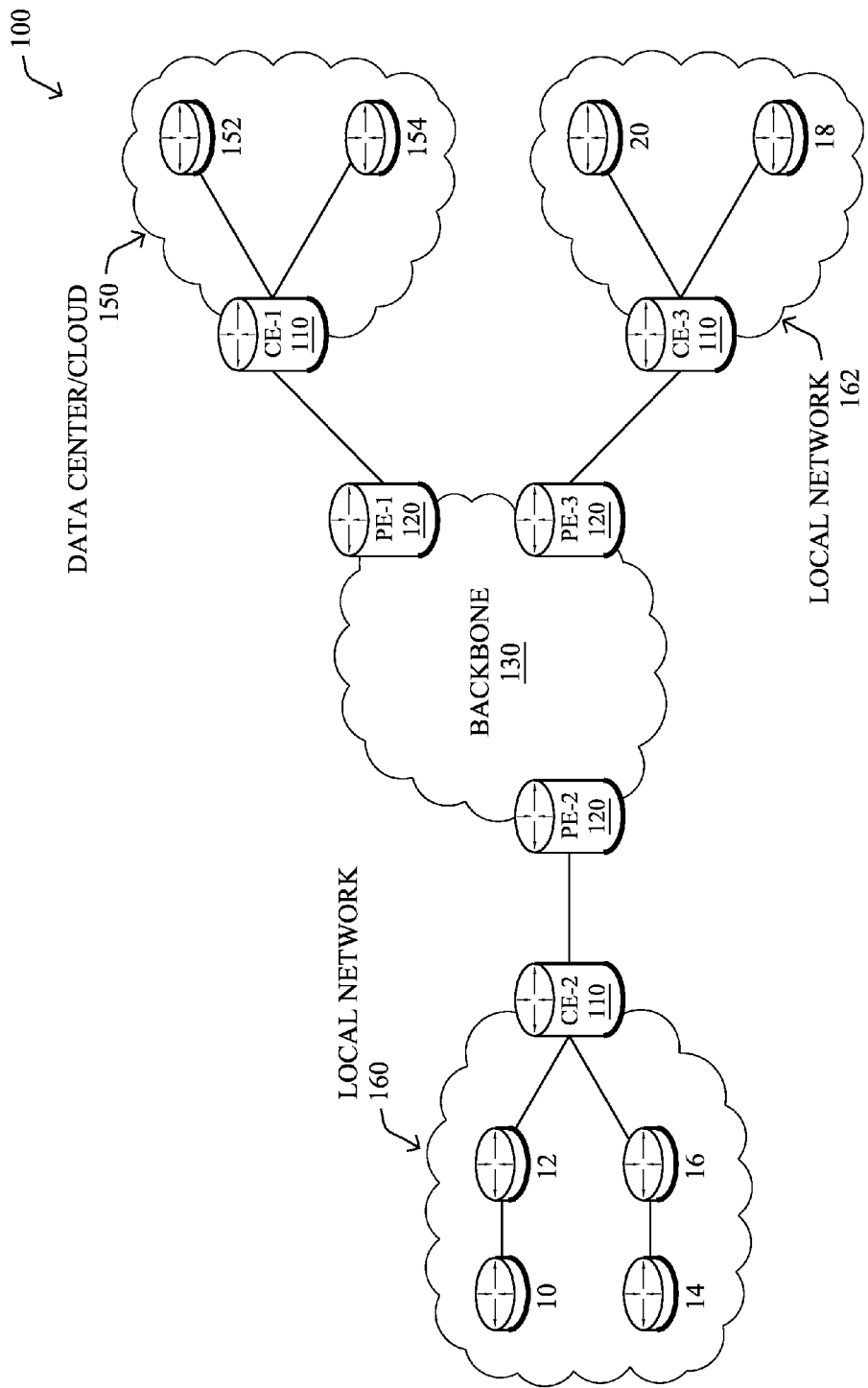

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
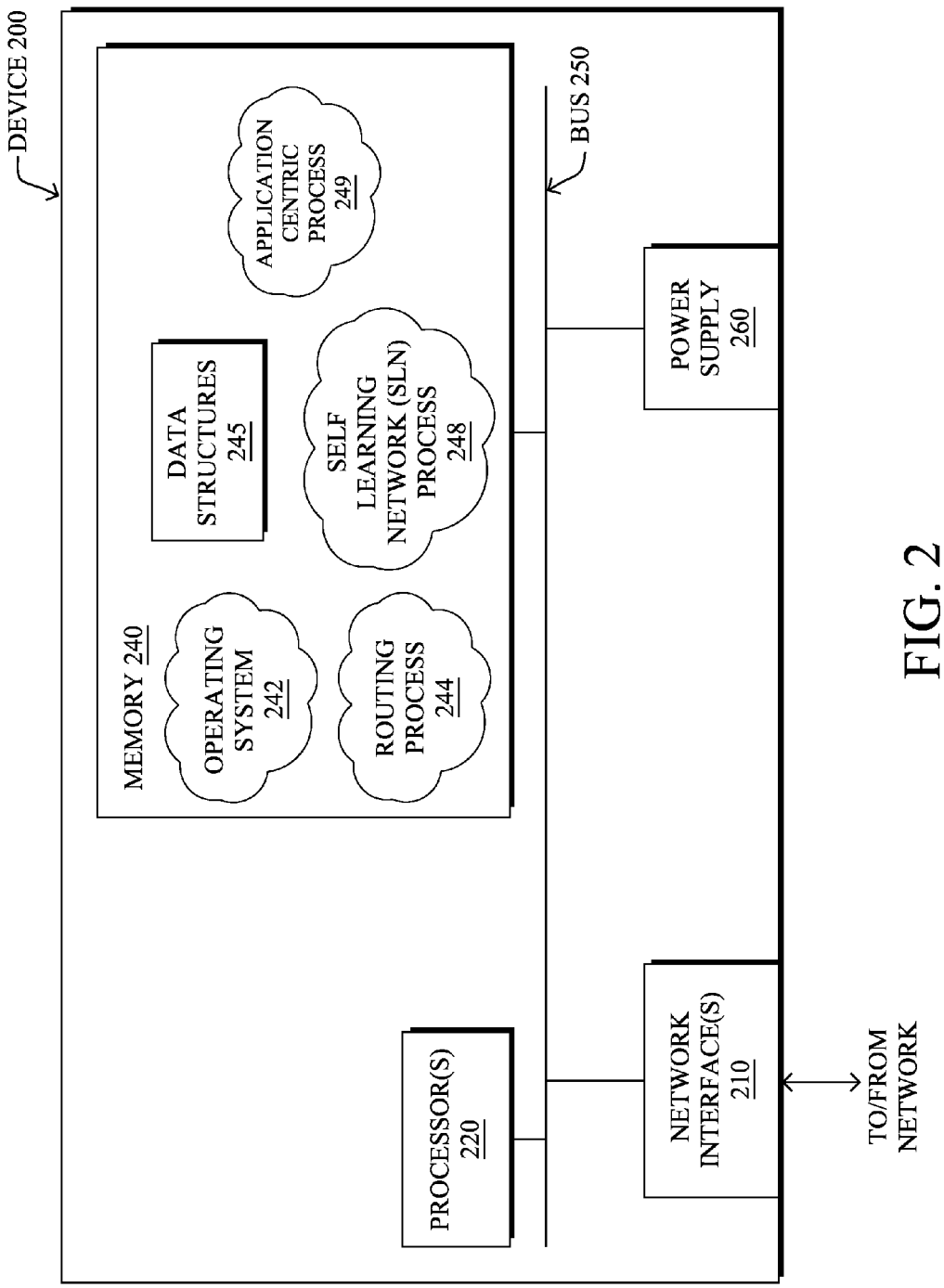
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), or any other computing device that supports the operations of network 100 (e.g., switches, etc.). The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248 and/or an application-centric process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points).

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

As noted above, anomaly detection may be used to detect and mitigate anomalous conditions such as attacks, botnets, hacking attempts, the spread of malware, and the like. Typically, there are two primary scenarios in which an application may cause an anomaly in the network. In one scenario, vulnerabilities in an application may be exploited for purposes of security breaches and/or data exfiltration, leading to an anomalous condition in the network. Example vulnerabilities may include, e.g., a day zero bug, a Bash shell exploit, etc. In the other scenario, an application may be functioning properly, but may still be used as a transport mechanism for malicious purposes, thereby also creating anomalies in the network. For example, an email application may be used to transfer a Trojan, a web browser application may make use of a Javascript™ exploit, etc. In both of these scenarios, the network is always involved and experiences the anomalous condition firsthand. However, a typical networking device (e.g., a router, etc.) does not interact directly with the application/operating system of the endpoint device, making detection and mitigation of these types of anomalies challenging.

Tracking Anomaly Propagation at the Network Level

The techniques herein provide an application-centric approach to tracking and mitigating the spread of anomalies in a network. In particular, a set of mechanisms are disclosed that allow the applications and/or the underlying operating systems running on end hosts to interact with network devices, thereby allowing effective mitigation of application anomalies by the network itself. In some aspects, communication mechanisms are disclosed that enables a networking device to communicate with a particular application, allowing application-centric metrics for the application to be tracked and shared. Notably, the techniques herein allow the network element to communicate with end-user applications and vice-versa, such that network anomalies tied to the application may be prevented from spreading. In further aspects, mitigation mechanisms are disclosed that allow a network device either to proactively mitigate a detected anomaly or to coordinate the performance of an anomaly mitigation action with the host or server device of the application itself.

Specifically, according to one or more embodiments of the disclosure as described in detail below, a device in a network monitors one or more metrics regarding network traffic associated with a particular application. The device detects an application-centric anomaly based on the monitored one or more metrics. The device causes an anomaly mitigation action to be performed in the network, in response to detecting the application-centric anomaly.

Illustratively, the techniques described herein may be performed by hardware, software, and/or firmware, such as in accordance with the application-centric process 249, which may include computer executable instructions executed by the processor 220 (or independent processor of interfaces 210) to perform functions relating to the techniques described herein, e.g., in conjunction with routing process 244 (and/or SLN process 248).

Operationally, network devices may be configured to operate as part of an SLN infrastructure to detect, analyze, and/or mitigate network anomalies such as network attacks (e.g., by executing SLN process 248 and/or application-centric process 249). Such an infrastructure may include certain network devices acting as distributed learning agents (DLAs) and one or more supervisory/centralized devices acting as a supervisory learning agent (SLA). In general, a DLA may be operable to monitor network conditions (e.g., router states, traffic flows, etc.), perform anomaly detection on the monitored data using one or more machine learning models, report detected anomalies to the SLA, and/or perform local mitigation actions. Similarly, an SLA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

Figure 3:
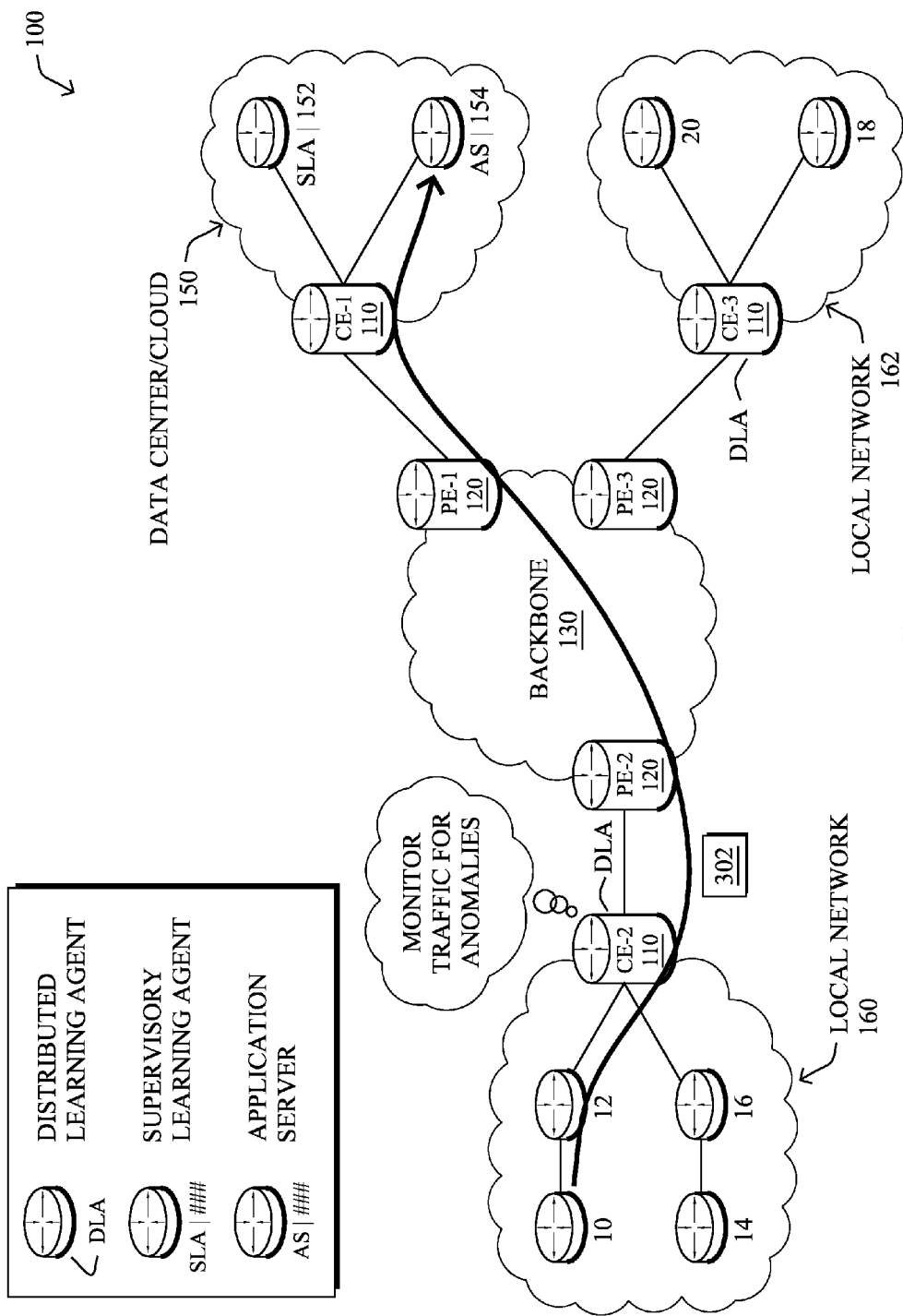
FIG. 3 illustrates an example self learning network (SLN) infrastructure.

An example of an SLN infrastructure is shown in FIG. 3, according to various embodiments. As shown, assume that routers CE-1 and CE-3 are configured as DLAs and that server 152 is configured as an SLA. In such a case, routers CE-1 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SLA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154. In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

Figure 4A:
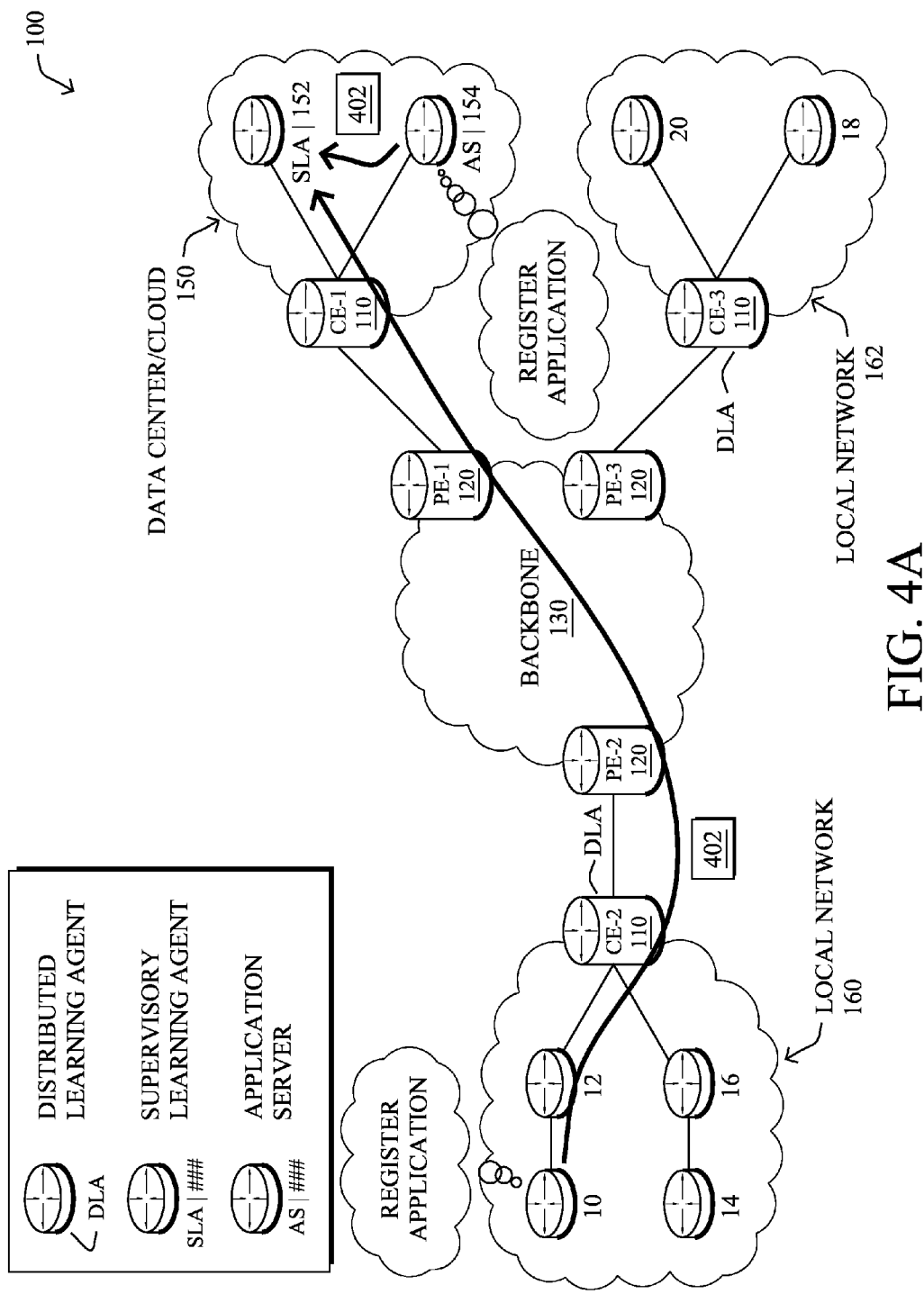
FIGS. 4A-4E illustrate examples of application-centric metrics being monitored in a network.

FIGS. 4A-4E illustrate examples of application-centric metrics being monitored in a network, according to various embodiments. In one embodiment, the SLA in an SLN infrastructure may be configured to act as an application registration and coordination device. In other embodiments, a different device in the network (e.g., another server, router, etc.) may function as the application registration and coordination device. In general, the application and registration device accepts registrations from applications and network elements that support application-centric networking and, in turn, coordinates their communications. For example, as shown in FIG. 4A, an endpoint device 10 executing a client of a particular application and/or an endpoint application server 154 may send an application registration request 402 to SLA 152, acting as the application registration device.

In general, an application as used herein corresponds to any software process that has both a client component and a server component (e.g., an application that operates by sending data through a network). For example, in the case of an email application, client device 10 may execute an email client program that accesses an email service hosted by server 154. In such a case, either the email client on device 10 and/or the email service on application server 154 may register the mail application with the application registration device (e.g., SLA 152). In some embodiments, the process may initiate application registration directly with the registration device. In other embodiments, the application may be registered via the operating system (OS) of the host device (e.g., operating system 242 of the device may be configured to support the application-centric mechanisms disclosed herein).

Application registration request 402 may include various information regarding the particular application to be registered. For example, application registration request 402 may indicate to SLA 152 that SLA 152 will be receiving data periodically from the application itself. This data may include, for example, a periodic keep-alive (e.g., to continue to keep the application registered), one or more application-centric metrics to be monitored within the network, application-specific notifications or queries, or the like. Such a request may, in effect, allow the application to announce its presence to the network devices and convey the support that the application needs from the network elements.

Figure 4B:
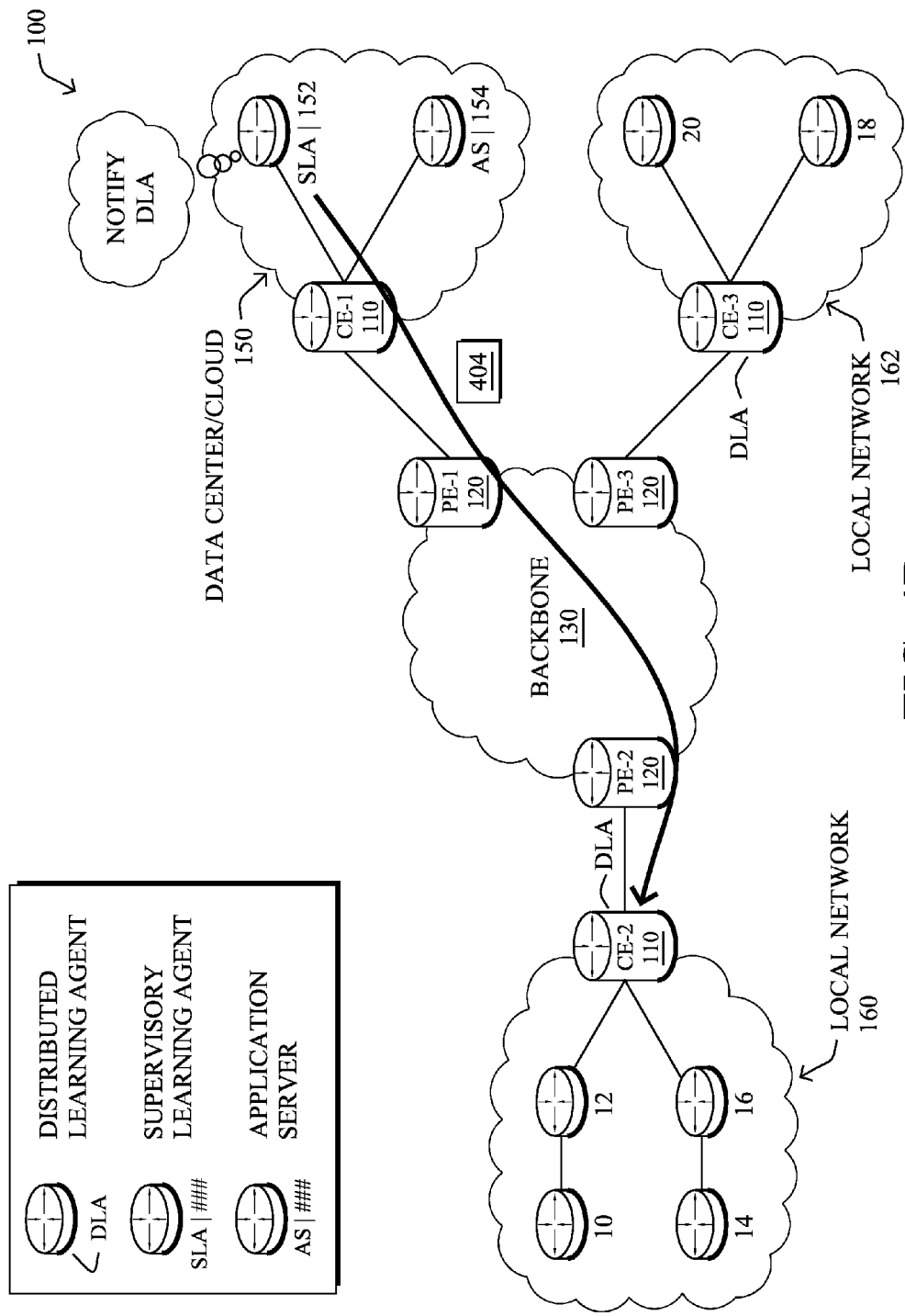

Once the application is registered with the application registration device, the registration device may notify one or more affected networking devices regarding the particular application, in some embodiments. For example, as shown in FIG. 4B, SLA 152 acting as the application registration and coordination device may send a notification 404 to CE-2/DLA 110 that registers the application with CE-2/DLA 110. In other embodiments, the application may register itself directly with a networking device (e.g., without using a centralized registration server).

Figure 4C:
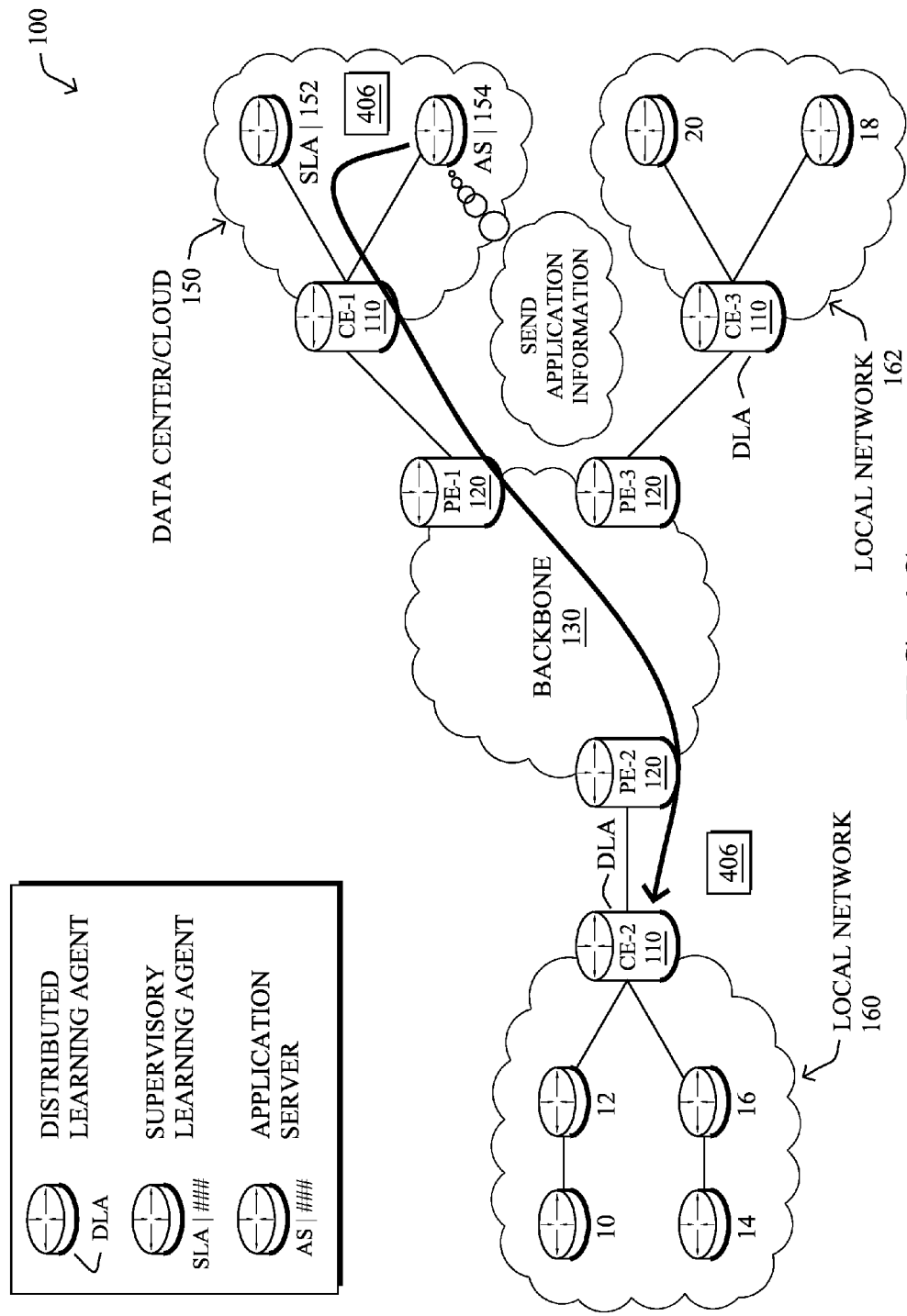

The application registration and coordination device may also be operable to coordinate the generation and reporting of application-centric information between the network elements and the application itself. For example, as shown in FIG. 4C, application information 406 may be sent to CE-2/DLA 110 from SLA 152 (e.g., the registration and coordination device), as sent to SLA 152 by the application (e.g., by application server 154).

In general, application information 406 may indicate one or more application-centric metrics that CE-2/DLA 110 should attempt to monitor. For example, in one embodiment, if an application server needs to communicate a sudden increase in traffic to the network elements, it may indicate the traffic increase to the registration and coordination device which, in turn, may relay this information to the network element(s) that are registered to support the particular application. This information shared by and to the application is not the traditional network QoS oriented metrics, but instead aims to capture the characteristics of application's services and performance. For example, a network device may be instructed to monitor the number of unique connections associated with the application, metrics regarding the flow duration of a traffic flow associated with the particular application (e.g., an average duration, a maximum duration, etc.), or a volume of the network traffic associated with the particular application.

Figure 4D:
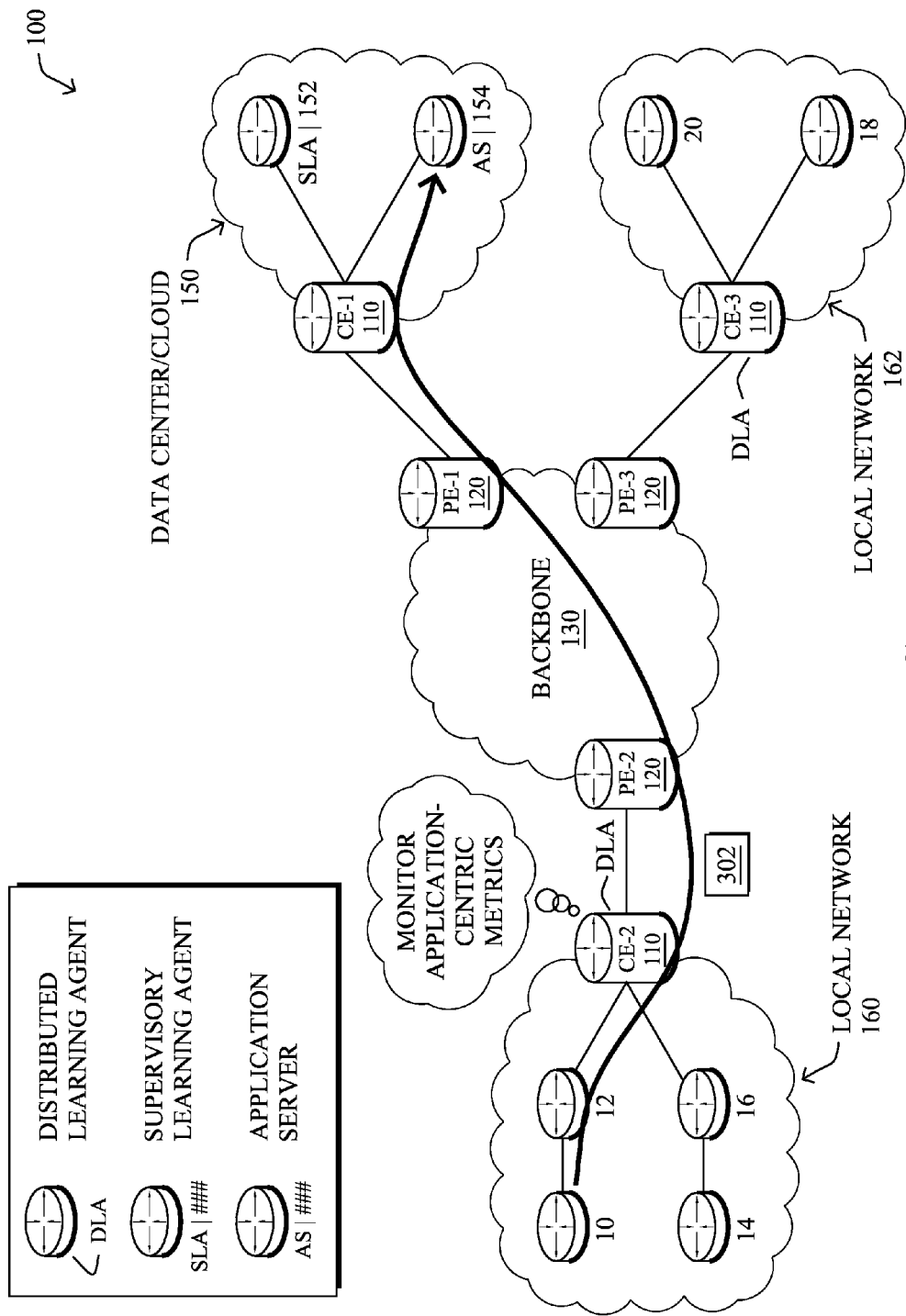

As shown in FIG. 4D, CE-2/DLA 110 may begin monitoring the one or more application-centric metrics specified by application information 406. For example, CE-2/DLA 110 may track the duration of traffic flow 302 or the number of unique connections between device 10 and application server 154 that are associated with the registered application. In another example, CE-2/DLA 110 may capture the number of new connections originating from an endpoint on a specific port (e.g., a specific port of device 10), the duration of these connections, the data being exchanged, the time of the day this happens, etc. In contrast to existing monitoring techniques, the metrics to be captured by the networking device are specified by the application itself, as opposed to a human operator.

The networking device that monitors application-centric metrics may do so using any number of techniques. For example, the networking device may perform deep packet inspection (DPI) on the packets associated with the application and/or monitor Netflow records, Simple Network Management Protocol (SNMP) data, Software Defined Networking (SDN) data, or the like.

Figure 4E:
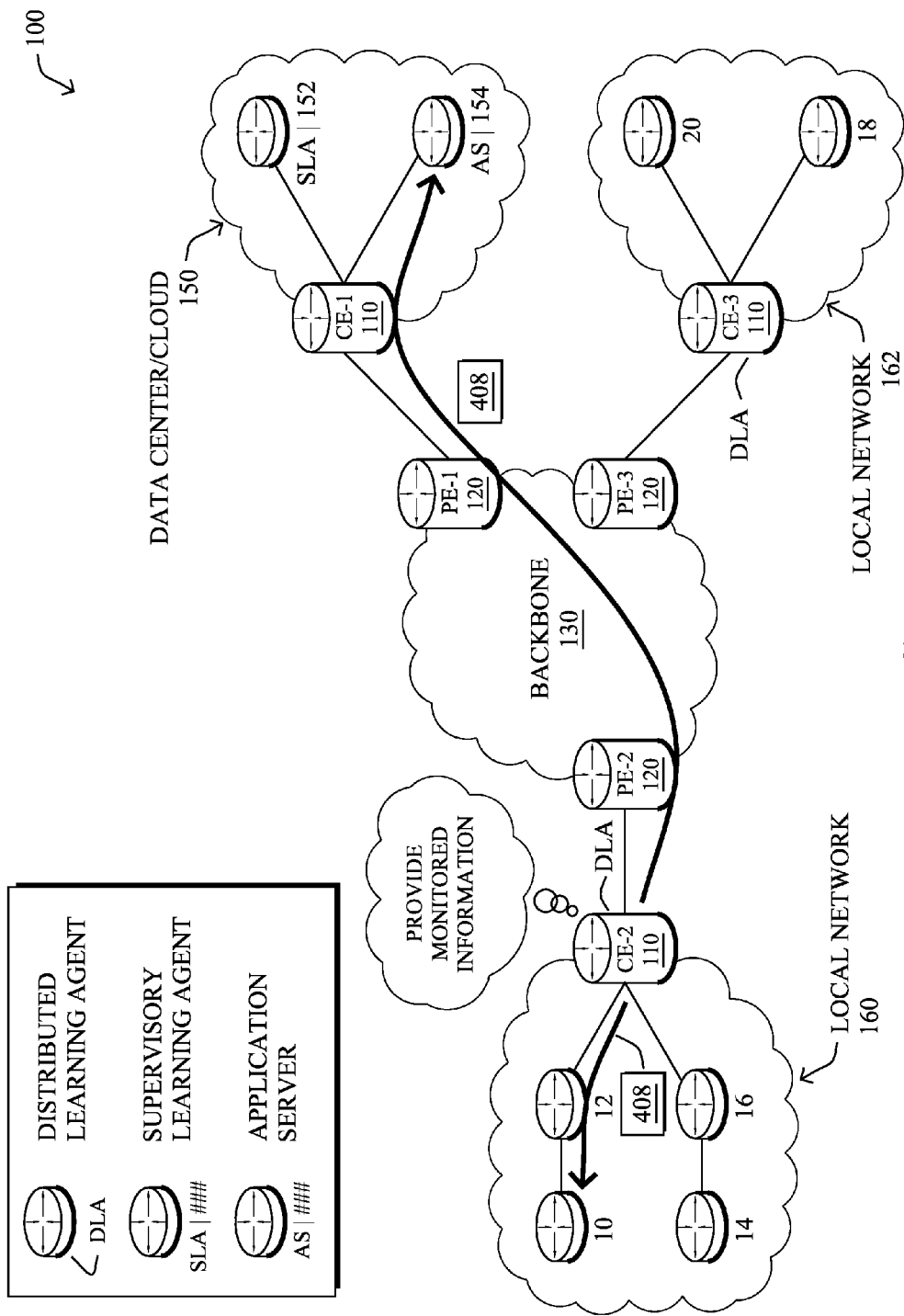

In some embodiments, a network device that monitors application-centric metrics may provide such metrics back to the application itself. For example, as shown in FIG. 4E, CE-2/DLA 110 may provide the monitored application-centric metrics 408 back to device 10 and/or to application server 154. In doing so, the application may use metrics 408 to improve its performance, if necessary. For example, the application may spawn more processes based on metrics 408 or perform other operations to improve the performance of the application.

As would be appreciated, the infrastructure disclosed above establishes communication channels between applications running at the endpoint devices along a network path and the intermediary network elements affected by the applications. In addition, the above infrastructure above also provides a setup state such that the various application-centric entities may interact with one another and stay in lockstep.

Figure 5A:
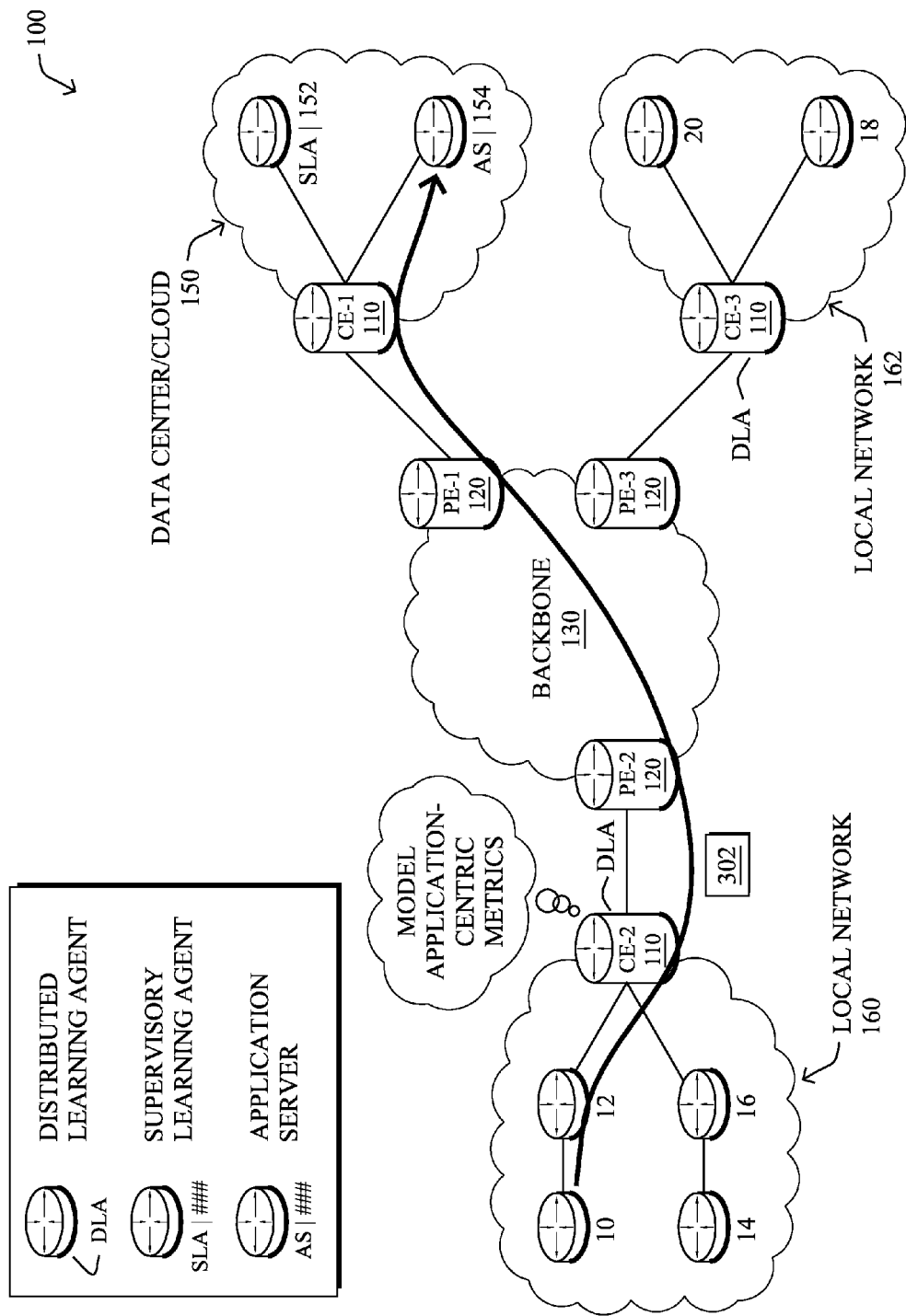
FIGS. 5A-5C illustrate examples of application-centric anomalies being detected in a network.
Figure 5B:
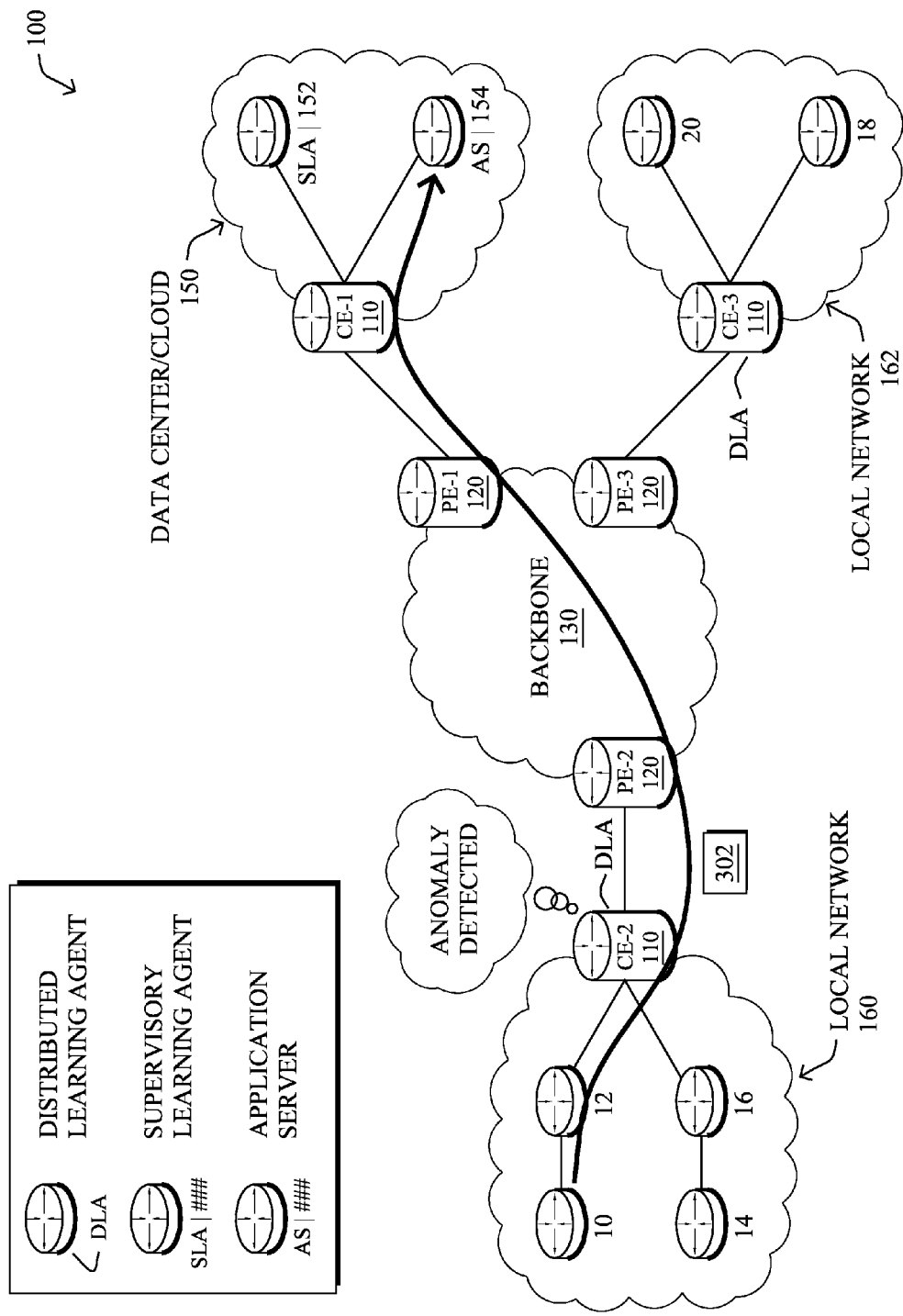
Figure 5C:
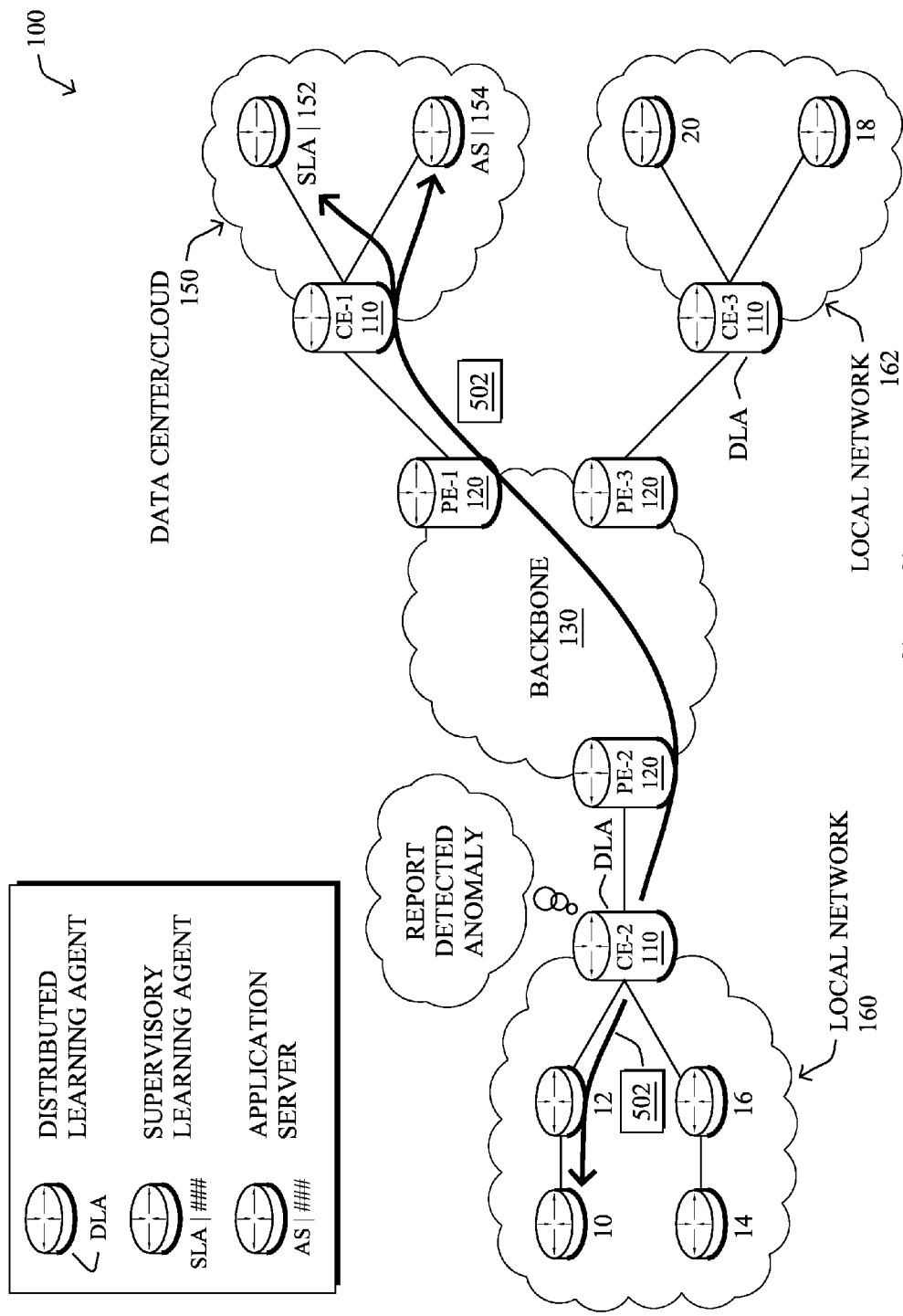

According to various embodiments, the application-centric monitoring techniques herein may be used for purposes of detecting an application-centric network anomaly. For example, FIGS. 5A-5C illustrate examples of application-centric anomalies being detected in network 100. As noted previously, the monitoring techniques herein allow applications to share application-centric performance metrics with a network device that are to be tracked by the network device. In cases where the monitoring networking device is also a DLA, the device may capture the application-centric metrics (e.g., at the edge of the network) and use these metrics to generate a model. For example, as shown in FIG. 5A, CE-2/DLA 110 may generate one or more models using the monitored application-centric metrics.

In one embodiment, assume that the application is interested in the number of unique connections established per host, as well as the amount of data transferred per connection per host. The corresponding network element may then track these metrics and start to build a model specific to these metrics and the particular application. In another embodiment, the underlying endpoint OS itself could be interested in metrics that relate to the endpoint itself and use the techniques herein to track and model metrics regarding a particular application executed by the endpoint.

Once a model for the particular application-centric metrics has been generated, anomalies may then be categorized as metric values that present themselves as outliers. For example, as shown in FIG. 5B, assume that CE-2/DLA 110 tracks the number of connections being made with application server 154 over specific periods of time. If the number of connections starts to increase rapidly, this may indicate some form of network attack that attempts to cause a denial of service. In another embodiment, assume that application server 154 is a mail server and requests that CE-2/DLA 110 track the number of emails sent by a particular client. CE-2/DLA 110 may do so by tracking the number of connections and volume of traffic per connection. In such a case, an anomaly may correspond to a large number of emails being sent, which may signify the presence of a Trojan being propagated via the email application.

In various embodiments, a DLA may provide an indication of a detected anomaly back to the application itself and/or to the SLA. For example, as shown in FIG. 5C, CE-2/DLA 110 may provide indication 502 to endpoint device 10 (e.g., the host of the application client), to SLA 152, and/or to application server 154, in response to detecting an anomaly in the application-centric metrics associated with the particular application.

Anomaly mitigation may be performed in a number of different ways, once an anomaly is detected in the monitored application-centric metrics. For example, FIGS. 6A-6D illustrate examples of anomaly mitigation being performed in network 100, according to various embodiments.

Figure 6A:
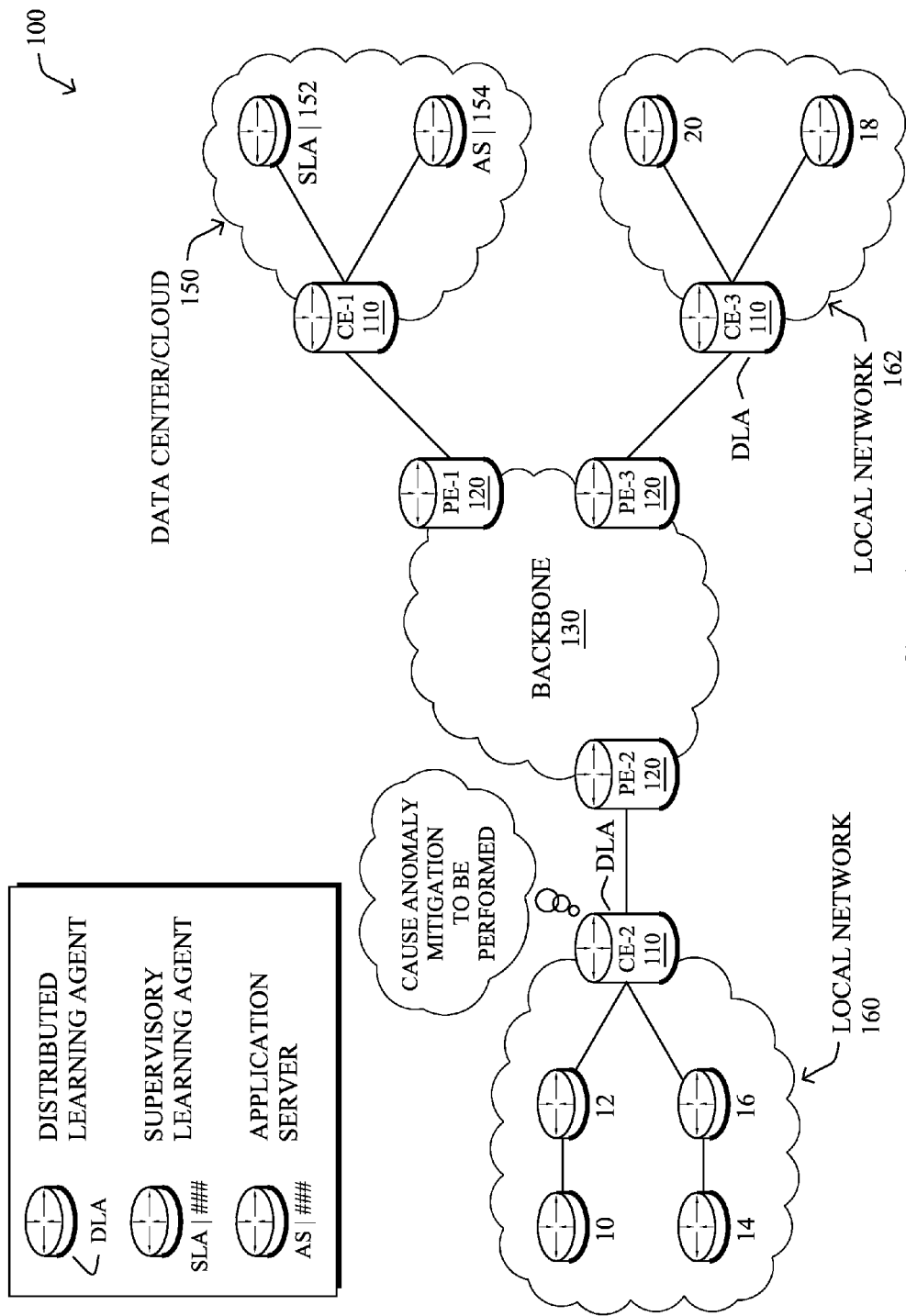
FIGS. 6A-6D illustrate examples of anomaly mitigation being performed in a network.

As shown in FIG. 6A, CE-2/DLA 110 may cause an anomaly mitigation action to be performed, in response to detecting an anomaly in the monitored application-centric metrics. In some embodiments, the DLA may provide information regarding the anomalous metric to the application (e.g., as part of indication 502), so that the application can either perform the mitigation action on its own or seek assistance from the corresponding network element. In other embodiments, the DLA may autonomously perform an anomaly mitigation operation without interacting with the application itself (e.g., on its own, in conjunction with supervision by the SLA, etc.). For example, the DLA may perform an anomaly mitigation action according to a policy that was defined by a network administrator or by the application itself (e.g., rules or mitigation steps that were programmed directly by the application provider).

In various embodiments, the anomaly mitigation mechanisms herein may leverage the application-centric communication infrastructure described above, to mitigate the anomaly. In other words, the DLA may communicate with the end host (e.g., the client device or application server), to mitigate the detected anomaly. Notably, the networking device itself may communicate directly with the various software components of the end host (e.g., the application process executed by the device and/or the OS of the device), to initiate mitigation. Thus, in some cases, anomaly indication 502 may also include a request or instruction that causes the endpoint device to perform the mitigation action itself.

In one embodiment, if the application provides a direct interface with the DLA, the DLA may request that the application stop sending out any traffic. To support this, the DLA and application may use customized messages that represent the various control loop tasks. In another embodiment, if the OS of the endpoint device provides the interface, the DLA may directly ask the OS to shut down specific processes associated with the application and/or kill any traffic correspond to the application. This too may be performed by the DLA and endpoint device exchanging custom control loop commands that map specific OS level tasks to mitigation actions.

Figure 6B:
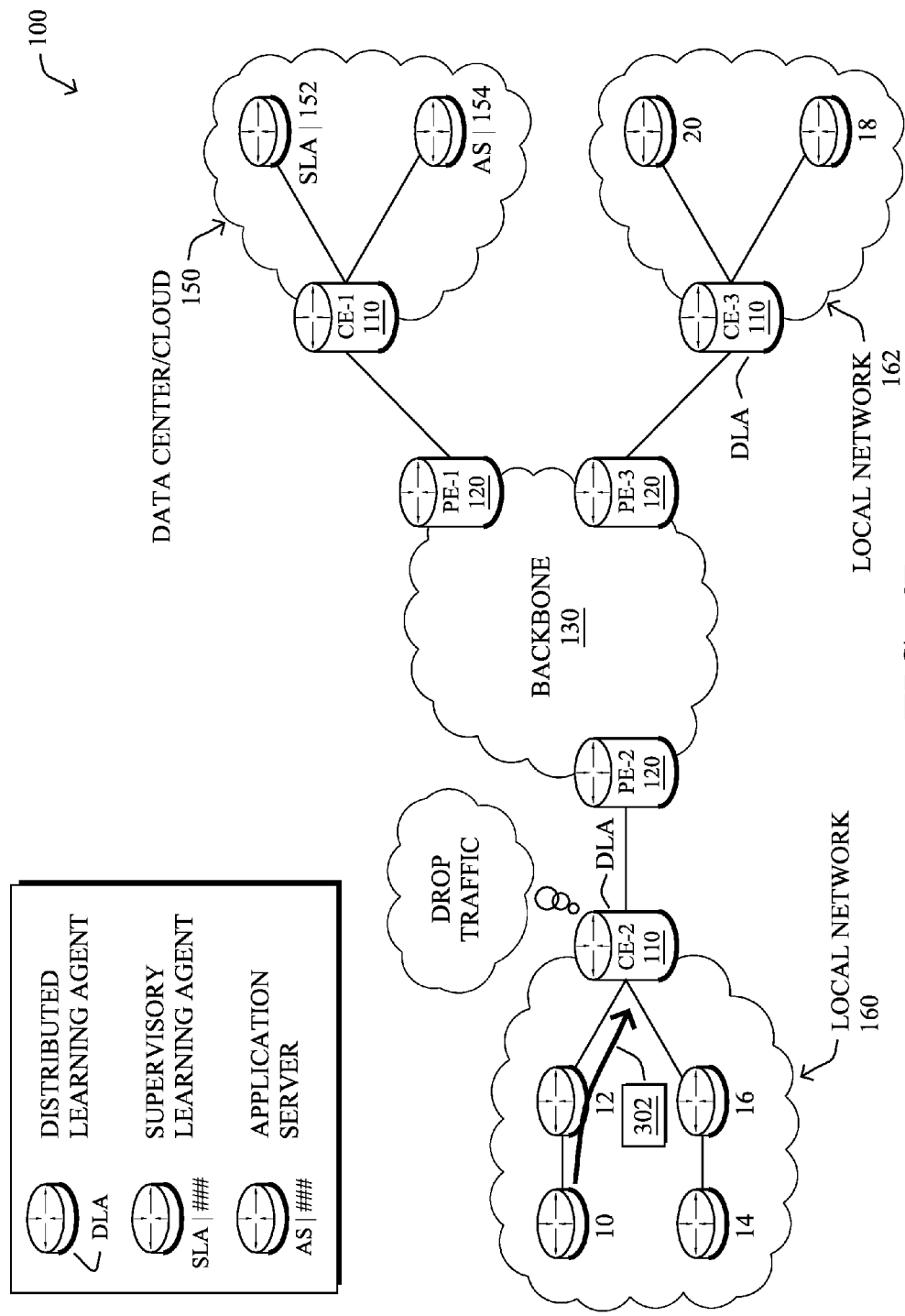
Figure 6C:
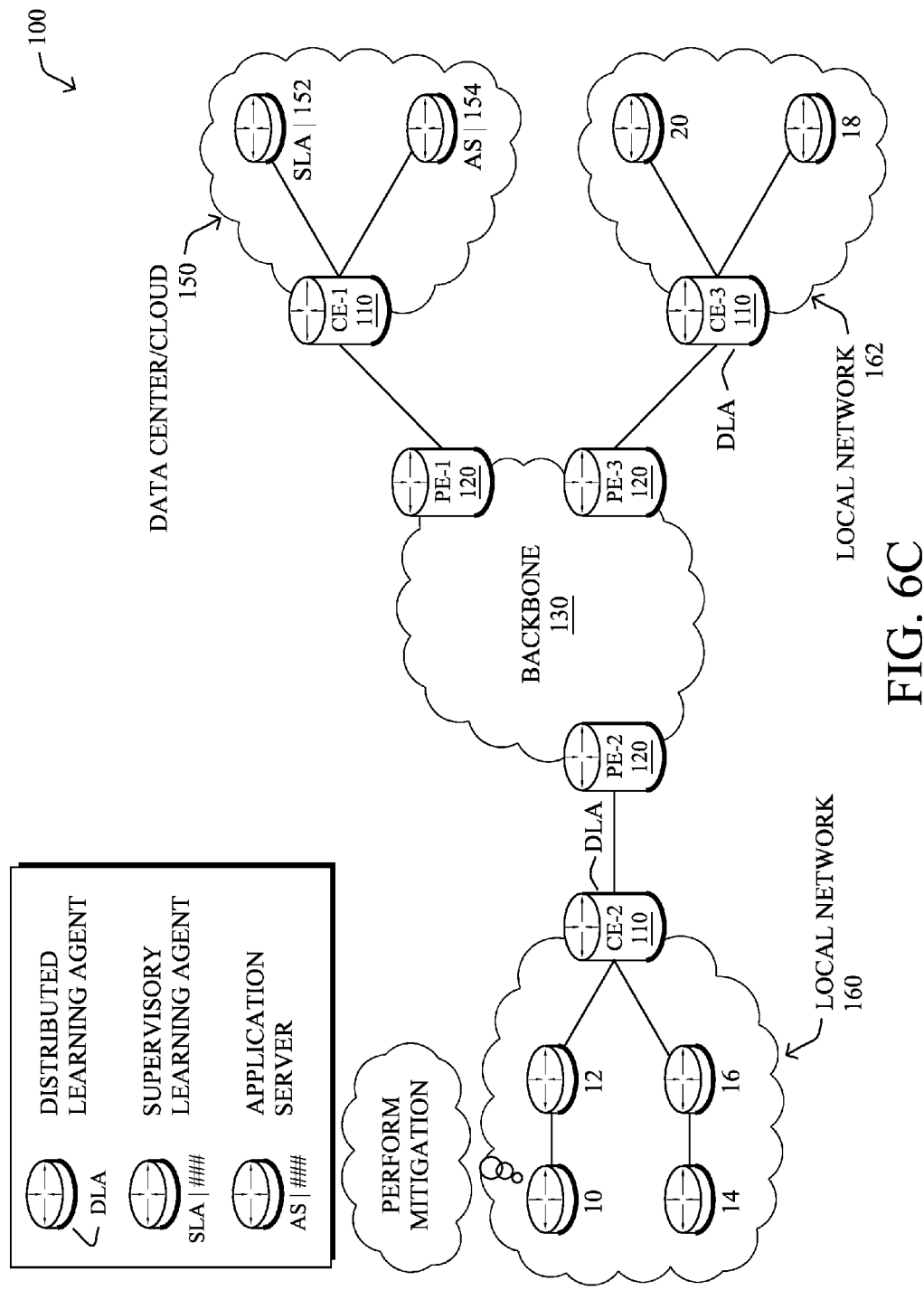
Figure 6D:
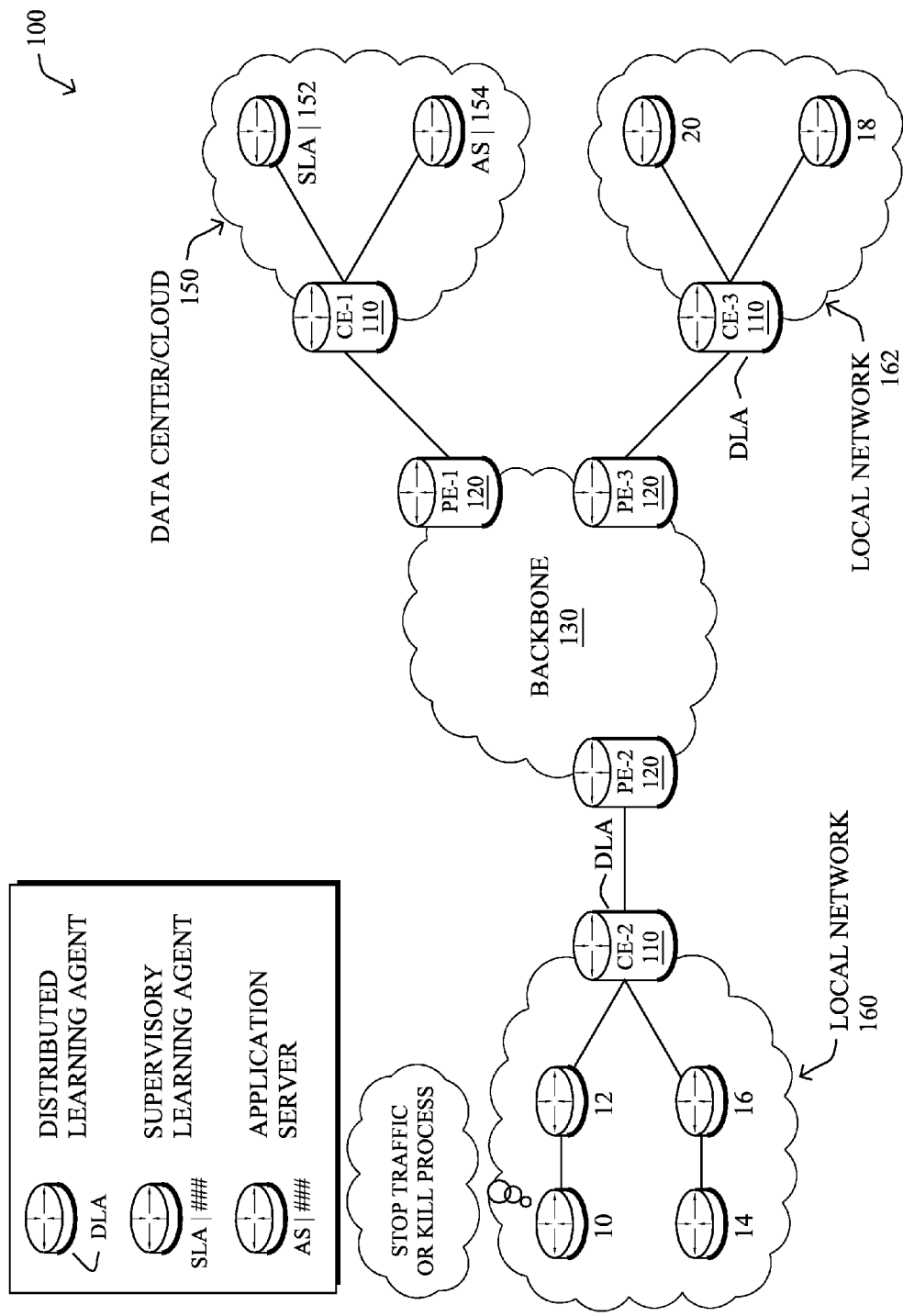

As noted previously, anomaly mitigation may fall under one of two categories: network element-driven mitigation and application-driven mitigation. In the network-element driven case, the network element itself may perform the anomaly mitigation operation based on input that it receives from the application itself (e.g., the ideal or expected values of the monitored metrics, the mitigation action to be performed, etc.) or autonomously. For example, as shown in FIG. 6B, CE-2/DLA 110 may perform anomaly mitigation by dropping all traffic associated with traffic flow 302, in response to detecting an anomaly. In another example, assume that CE-2/DLA 110 is instructed by the application to monitor the number of port scans conducted by the endpoint devices. In such a case, input from the underlying OS may cause the CE-2/DLA 110 to drop all traffic on ports that do not have any prior history of traffic.

In the application-driven approach to anomaly mitigation, after the network device has determined the anomalous metric, the network device may cause the endpoint device hosting the application to initiate mitigation. For example, as shown in FIG. 5C, endpoint device 10 may perform the anomaly mitigation action, either based on its own analysis of the detected anomaly or as instructed by the DLA (e.g., in response to receiving indication 502 from CE-2/DLA 110). Example mitigation actions that may be performed by the endpoint device may include, but are not limited to, the endpoint device shutting down one or more running processes associated with the application or stopping traffic associated with the application (e.g., by shutting down ports, etc.). For example, as shown in FIG. 5D, assume that endpoint device 10 is generating an abnormally high number of port scans. In such a case, information from the DLA, or another device in conjunction therewith, may cause the OS of device 10 to shut down the interfaces to stop the port scans or otherwise kill the processes that are generating the port scans. Thus, in the application-driven mitigation approach, the underlying application or OS may be configured to receive input from the network device(s) and take any recommended or appropriate mitigation actions. Using this approach, the network device and the application/OS of the endpoints/servers running the application can work together to prevent the spread of anomalous behavior in the network.

Figure 7:
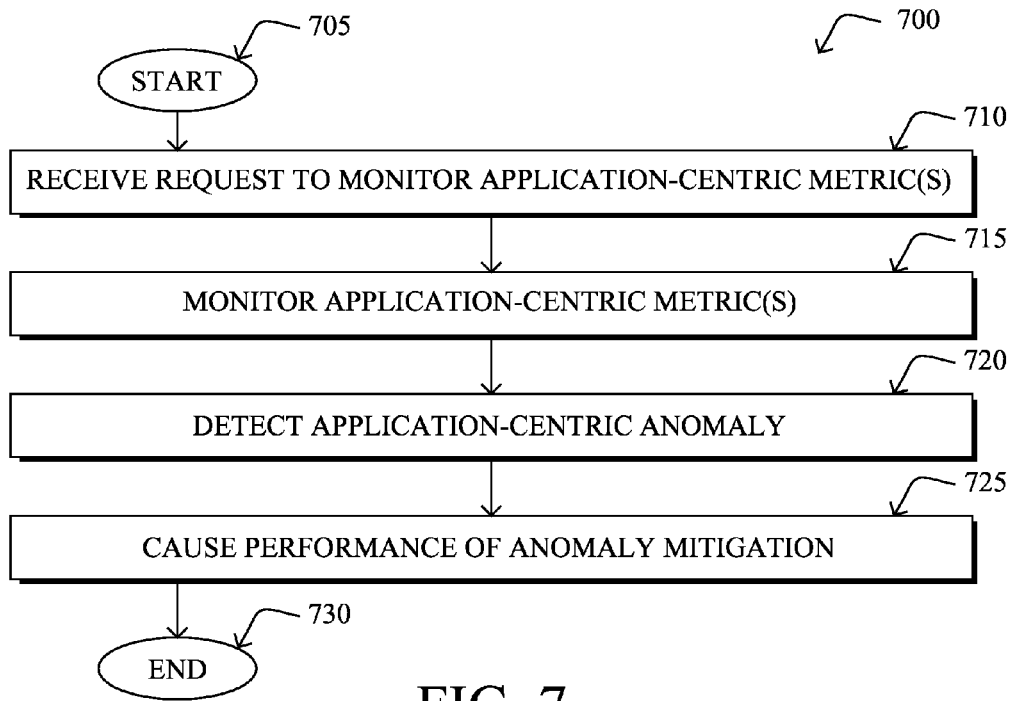
FIG. 7 illustrates an example simplified procedure for causing an anomaly mitigation action to be performed.

FIG. 7 illustrates an example simplified procedure for causing an anomaly mitigation action to be performed, in accordance with various embodiments herein. For example, a network device acting as a DLA may perform procedure 700 by executing SLA process 248 and application-centric process 249. The procedure 700 may begin at step 705 and continue on to step 710 where, as described in greater detail above, the device receives a request to monitor one or more application-centric metrics. In general, the application-centric metrics may differ from QoS metrics (e.g., delay, jitter, packet loss, etc.) that the device may typically monitor. For example, the application-centric metrics may include, but are not limited to, the number of unique connections associated with the particular application, flow duration metrics for traffic flows associated with the particular application, traffic volume metrics associated with the particular application, or the like.

In various embodiments, the metrics specified in the request may be selected by the endpoint device running the application (e.g., by the application itself or the OS of the device running the application). In some embodiments, the request may be sent to the device via an application registration device. Such a registration device may, for example, register the particular application with one or more networking devices and coordinate communications between the networking devices and the application/OS itself.

At step 715, as detailed above, the device monitors the requested one or more application-centric metrics. For example, the device may perform DPI on packets associated with the application that are flowing through the device, monitor Netflow records for the application, analyze SNMP or SDN data, or the like, to capture the application-centric metrics. The captured metrics may be either in raw form (e.g., a count of observed behavior, etc.) or may be calculated by the device based on the observed behavior (e.g., a calculated statistic, rate, etc.), in various cases.

At step 720, the device detects an application-centric anomaly based on the monitored one or more metrics associated with the application, as described in greater detail above. In some embodiments, the device may detect the anomaly by comparing the monitored metrics(s) to one or more anomaly detection models. Such a model may correspond to a specific range or set of ranges of expected values for the monitored metrics. In some embodiments, the model may be constructed using machine learning techniques and trained using the monitored metrics as inputs (e.g., using clustering techniques, etc.).

At step 725, as highlighted above, the device causes an anomaly mitigation action to be performed in the network, in response to detecting the application-centric anomaly. In some embodiments, the device may perform the mitigation action directly. For example, the networking device may begin blocking/dropping traffic associated with the application, to mitigate the spread of the anomaly in the network. In other embodiments, the device may cause another device in the network to perform the anomaly mitigation action (e.g., a device hosting a client or server process of the application). In some cases, the device may send an instruction/request to the other device indicating the particular action to be performed. For example, the device may request that the host of the application stop sending traffic (e.g., by blocking one or more ports of the host, etc.) or kill the process associated with the application. In other cases, the other device may itself determine which mitigation action to take. For example, the networking device may indicate to the endpoint device/server that a particular anomaly was detected and, in turn, the endpoint device may perform an anomaly mitigation operation (e.g., by blocking traffic, by killing a running process, etc.). Procedure 700 then ends at step 730.

Figure 8:
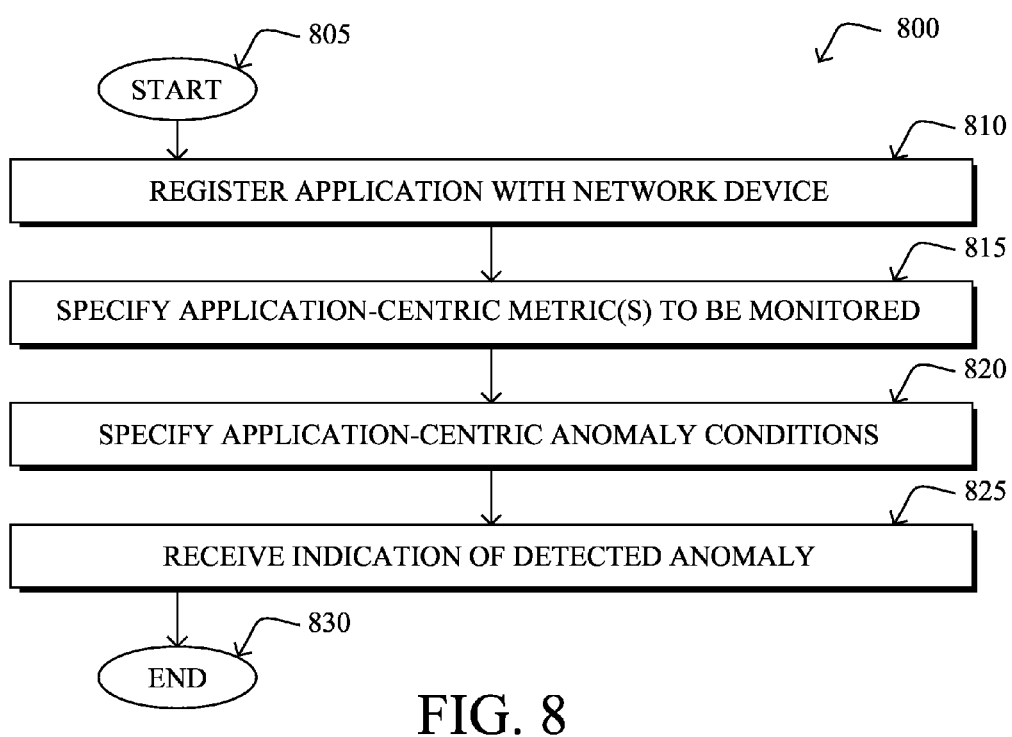
FIG. 8 illustrates an example simplified procedure for registering an application with a network device.

FIG. 8 illustrates an example simplified procedure for registering an application with a network device, according to various embodiments herein. Procedure 800 may be performed, in various cases, by a first device hosting a process associated with a particular application (e.g., a client or server process). As shown, procedure 800 may begin at step 805 and continue on to step 810 where, as described in greater detail above, the first device registers the particular application with a second device in the network (e.g., a router, switch, server, etc.). In some embodiments, the registration may be made via an application registration device that facilitates direct communications between the application/OS of the first device and the second device.

At step 815, as detailed above, the first device specifies one or more application-centric to be monitored by the second device. For example, the first device may request that the second device monitor the number of unique connections associated with the particular application, flow metrics regarding traffic flows associated with the particular application, traffic volume metrics associated with the particular application, or any other metrics that may be of interest to the application itself. Such metrics may be specific to the application and may, for example, be defined as part of the application's programming.

At step 820, the first device specifies one or more application-centric anomaly conditions, as described in greater detail above. Notably, the second device may use the specified one or more anomaly conditions and the specified one or more application-centric metrics to detect an anomaly in the network. In some cases, the first device may provide the detection parameters to the second device. For example, the first device may provide a set of threshold values or ranges that may be used by the second device to detect an anomaly. In other embodiments, the first device may simply specify the types of conditions for which the second device is to perform anomaly detection, thereby leaving the actual detection mechanism up to the second device (e.g., by constructing a machine learning model, etc.).

At step 825, the first device receives an indication of the detected anomaly from the second device, as detailed above. In some embodiments, the indication may simply include information regarding the detected anomaly (e.g., the type of anomaly, the anomalous metrics, etc.). In such cases, in one embodiment, the first device may perform an anomaly mitigation action, in response to receiving the indication. For example, the first device may shut down the application, block traffic (e.g., block ports, etc.) used by the application, or initiate other mitigation measures. In other embodiments, the indication received from the second device may include an instruction/request that the first device perform a specific mitigation action. For example, the second device may instead request that the first device shut down the application, block traffic associated with the application, etc. Procedure 800 then ends at step 830.

It should be noted that while certain steps within procedures 700-800 may be optional as described above, the steps shown in FIGS. 7-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 700-800 are described separately, certain steps from each procedure may be incorporated into each other procedure, and the procedures are not meant to be mutually exclusive.

The techniques described herein, therefore, provide for the coordination between applications and network elements, allowing for fine-grained anomaly detection and mitigation mechanisms to be used in a network. Notably, the techniques herein may allow both the application and the network to prevent anomalies from being propagated in the network. The distributed nature of the techniques herein also allow application-based network anomalies to be detected at the earliest point in time and at the farthest away point from the core of the network.

While there have been shown and described illustrative embodiments that provide for application-centric anomaly detection and mitigation, it is to be understood that various other adaptations and modifications may be made within the spirit and scope of the embodiments herein. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
monitoring, by a device in a network and based on receiving registration information for a particular application, one or more application-centric metrics regarding network traffic between an application server hosting the particular application and a client device accessing the application server, the application-centric metrics indicative of a behavior of the particular application;
detecting, by the device, an application-centric anomaly based on the monitored one or more application-centric metrics by comparing the behavior of the particular application to a machine learning based model that models traffic behaviors of the particular application; and
causing, by the device, an anomaly mitigation action to be performed in the network, in response to detecting the application-centric anomaly by comparing the behavior of the particular application to the machine learning based model.

2. The method as in claim 1, wherein the one or more application-centric metrics comprise at least one of: a number of unique connections associated with the particular application, a flow duration of a traffic flow associated with the particular application, or a volume of the network traffic associated with the particular application.

3. The method as in claim 1, further comprising:
receiving, at the device, a request to monitor the one or more application-centric metrics regarding network traffic associated with the particular application from one of: the application server hosting the particular application or the client device that accesses the application server.

4. The method as in claim 3, wherein the device receives the request from the application server or the client device via an application registration device in the network.

5. The method as in claim 1, wherein causing the anomaly mitigation action to be performed in the network comprises:
blocking, by the device, new traffic associated with the particular application that was not previously observed by the device.

6. The method as in claim 1, wherein causing the anomaly mitigation action to be performed in the network comprises:
requesting, by the device, that a process associated with the particular application stop sending the network traffic.

7. The method as in claim 1, wherein causing the anomaly mitigation action to be performed in the network comprises:
requesting, by the device, that another device executing a process associated with the particular application shut down the process.

8. The method as in claim 1, wherein causing the anomaly mitigation action to be performed in the network comprises:
providing, by the device, an indication of the detected application-centric anomaly to another device in the network, wherein the other device performs the anomaly mitigation action in response to receiving the indication.

9. The method as in claim 8, wherein the mitigation action corresponds to the other device stopping execution of a process associated with the particular application.

10. A method, comprising:
registering, by a first device in a network, a particular application with a second device in the network;
specifying, by the first device, one or more application-centric metrics to be monitored by the second device that are indicative of a behavior of the particular application;
specifying, by the first device, one or more anomaly conditions for the application-centric metrics, wherein the second device uses the specified one or more anomaly conditions and the specified one or more application-centric metrics to detect an anomaly in network traffic between an application server hosting the particular application and a client device accessing the application server that is associated with the particular application by comparing the behavior of the particular application to a machine learning based model that models traffic behaviors of the particular application; and
receiving, at the first device, an indication of the detected anomaly from the second device.

11. The method as in claim 10, wherein the one or more application-centric metrics comprise at least one of: a number of unique connections associated with the particular application, a flow duration of a traffic flow associated with the particular application, or a volume of the network traffic associated with the particular application.

12. The method as in claim 10, wherein the first device registers the application with the second device via an application registration device in the network.

13. The method as in claim 10, wherein receiving the indication of the detected anomaly from the second device comprises:
   receiving, from the second device, a request to perform an anomaly mitigation action.

14. The method as in claim 13, wherein the anomaly mitigation action corresponds to the first device shutting down the application.

15. The method as in claim 10, further comprising:
   performing, by the first device, an anomaly mitigation action, based on the detected anomaly and in response to receiving the indication of the detected anomaly.

16. The method as in claim 15, wherein the anomaly mitigation action corresponds to the first device shutting down the application.

17. An apparatus, comprising:
   one or more network interfaces to communicate with a network;
   a processor coupled to the one or more network interfaces and configured to execute a process; and
   a memory configured to store the process executable by the processor, the process when executed operable to:
      monitor, based on receiving registration information for a particular application, one or more application-centric metrics regarding network traffic between an application server hosting the particular application and a client device accessing the application server, the application-centric metrics indicative of a behavior of the particular application;
      detect an application-centric anomaly based on the monitored one or more application-centric metrics by comparing the behavior of the particular application to a machine learning based model that models traffic behaviors of the particular application; and
      cause an anomaly mitigation action to be performed in the network, in response to detecting the application-centric anomaly by comparing the behavior of the particular application to the machine learning based model.

18. The apparatus as in claim 17, wherein the one or more application-centric metrics comprise at least one of: a number of unique connections associated with the particular application, a flow duration of a traffic flow associated with the particular application, or a volume of the network traffic associated with the particular application.

19. The apparatus as in claim 17, wherein the apparatus causes the anomaly mitigation action to be performed by at least one of: blocking new traffic associated with the particular application that was not previously observed by the apparatus, requesting that a process associated with the particular application stop sending the network traffic, or requesting that a device executing the process associated with the particular application shut down the process associated with the particular application.

20. The apparatus as in claim 17, wherein the apparatus causes the anomaly mitigation action to be performed by:
   providing an indication of the detected application-centric anomaly to another device in the network, wherein the other device performs the anomaly mitigation action in response to receiving the indication.

21. An apparatus, comprising:
   one or more network interfaces to communicate with a network;
   a processor coupled to the one or more network interfaces and configured to execute a process; and
   a memory configured to store the process executable by the processor, the process when executed operable to:
      register a particular application with a device in the network;
      specify one or more application-centric metrics to be monitored by the device that are indicative of a behavior of the particular application;
      specify one or more anomaly conditions for the application-centric metrics, wherein the device uses the specified one or more anomaly conditions and the specified one or more application-centric metrics to detect an anomaly in network traffic between an application server hosting the particular application and a client device accessing the application server that is associated with the particular application by comparing the behavior of the particular application to a machine learning based model that models traffic behaviors of the particular application; and
      receive an indication of the detected anomaly from the second device.

22. The apparatus as in claim 21, wherein the one or more application-centric metrics comprise at least one of: a number of unique connections associated with the particular application, a flow duration of a traffic flow associated with the particular application, or a volume of the network traffic associated with the particular application.

23. The apparatus as in claim 21, wherein the process when executed is further operable to:
   perform an anomaly mitigation action, based on the detected anomaly and in response to receiving the indication of the detected anomaly.

24. The apparatus as in claim 21, wherein the apparatus receives the indication of the detected anomaly by:
   receiving a request to perform an anomaly mitigation action from the device.

* * * * *